(12) United States Patent
Bergeron et al.

(10) Patent No.: US 7,080,865 B2
(45) Date of Patent: Jul. 25, 2006

(54) INTEGRATED OPERATOR WORKSPACE INCORPORATED INTO A MOBILE COMPUTING VEHICLE

(75) Inventors: John M. Bergeron, Northfield, NH (US); Kjetil A. Sevre, Flaa (NO); Corrine M. St. Jean, Nashua, NH (US); Jonathan T. Longley, Lexington, MA (US); Joseph C. Spicer, Chelmsford, MA (US); Vidar M. Skjelstad, Kongsberg (NO); Carl E. Buczala, Rowley, MA (US); Stephen V. Olizarowicz, Tewksbury, MA (US); Shelley Rosenbaum Lipman, Billerica, MA (US)

(73) Assignee: Raytheon Company, Waltham, MA (US)

( * ) Notice: Subject to any disclaimer, the term of this patent is extended or adjusted under 35 U.S.C. 154(b) by 368 days.

(21) Appl. No.: 10/631,138

(22) Filed: Jul. 31, 2003

(65) Prior Publication Data

US 2006/0125264 A1    Jun. 15, 2006

(51) Int. Cl.
*B60P 3/35* (2006.01)
(52) U.S. Cl. ...................... 296/24.39; 296/3
(58) Field of Classification Search ............ 296/24.3, 296/24.32, 24.39
See application file for complete search history.

(56) References Cited

U.S. PATENT DOCUMENTS

| 3,584,911 A | * | 6/1971 | Coletto, Jr. ............... 296/24.3 |
| 4,538,995 A | * | 9/1985 | Fryer ........................ 434/432 |
| 5,924,515 A | * | 7/1999 | Stauffer ..................... 180/326 |

FOREIGN PATENT DOCUMENTS

| DE | 201 18 905 U 1 | 11/2001 |
| EP | 0 965 786 A1 | 12/1999 |
| EP | 1 174 306 A2 | 7/2001 |
| EP | 1 174 306 A3 | 7/2001 |

* cited by examiner

*Primary Examiner*—Joseph D. Pape
(74) *Attorney, Agent, or Firm*—Daly, Crowley, Mofford & Durkee, LLP

(57) ABSTRACT

An integrated operator workspace adapted for incorporation into a mobile computing vehicle. The integrated operator workspace includes a base having a first longitudinal edge and a second longitudinal edge. A first operator computing station is located adjacent to the first longitudinal edge of the base and a second operator computing station is located adjacent to the second longitudinal edge of the base. In this arrangement, the first and second operator computing stations are separated from each other by a first predetermined space, which permits unimpeded ingress and egress of the integrated operator workspace by a first user operating at the first operator station and a second user operating at the second operator station.

38 Claims, 3 Drawing Sheets

INTEGRATED OPERATOR WORKSPACE INCORPORATED INTO A MOBILE COMPUTING VEHICLE

FIELD OF THE INVENTION

This invention relates to an integrated operator workspace and more particularly to an integrated operator workspace incorporated into a vehicle that permits users located in the vehicle to engage in computing and/or communications operations.

BACKGROUND OF THE INVENTION

As is known in the art, there is an increasing trend to include electronics equipment in vehicles, such as radar systems, computer systems and communications equipment, particularly for use in military vehicles. For example, it is desirable to include such electronics equipment in military trucks and/or in highly mobile multi-wheeled vehicles, which are commonly referred to as "Humm-Vees." The electronics equipment must be relatively compact in order to fit into confined spaces defined in the vehicles.

After all desired electronics equipment is installed in a particular vehicle, however, there is relatively minimal space remaining for operator workspace. The minimal operator workspace remaining after installation of the desired electronics equipment also introduces relatively poor air circulation.

Furthermore, seating arrangements in the vehicle proximate to the electronics equipment typically require that an outer-most operator of the electronics equipment leave his/her operational station in order to permit an inner-most operator of the electronics equipment to enter or leave his/her operational station. The space constraints of the above-described vehicle are further exacerbated in military applications, where operators are required to change into protective gear, such as chemically protective suits, Mission Oriented Protective Posture IV (e.g., MOPP IV) protection gear, or the like, which is hampered by the constrained operator workspace.

It would, therefore, be desirable to overcome the aforesaid and other disadvantages.

SUMMARY OF THE INVENTION

The present invention provides a vehicle incorporating an integrated operator workspace. With this arrangement, users of the integrated operator workspace can efficiently ingress and egress each of their operator computing stations, change into protective gear and/or access electronics equipment, as well as be provided with improved air circulation. While the integrated operator workspace is primarily shown and described in conjunction with a vehicle, it should be understood that the integrated operator workspace may be incorporated into a number of other vehicles or personnel carriers, as will become apparent below.

In an aspect of the present invention, the integrated operator workspace includes a base defined by a floor portion of the mobile computing vehicle. The base has a first longitudinal edge and a second longitudinal edge. A first operator computing station is located adjacent to the first longitudinal edge of the base and a second operator computing station is located adjacent to the second longitudinal edge of the base. The integrated operator workspace further includes a plurality of electronic equipment, which is coupled to form a communication relationship with the first operator station and the second operator station.

The first and second operator computing stations are separated by a first predetermined space, which permits unimpeded ingress and egress of the integrated operator workspace by a first user located at the first operator computing station and a second user located at the second operator computing station. In one embodiment, the integrated operator workspace is adapted to be included in a mobile computing vehicle or shelter, such as a truck, van, or a Humm-Vee.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
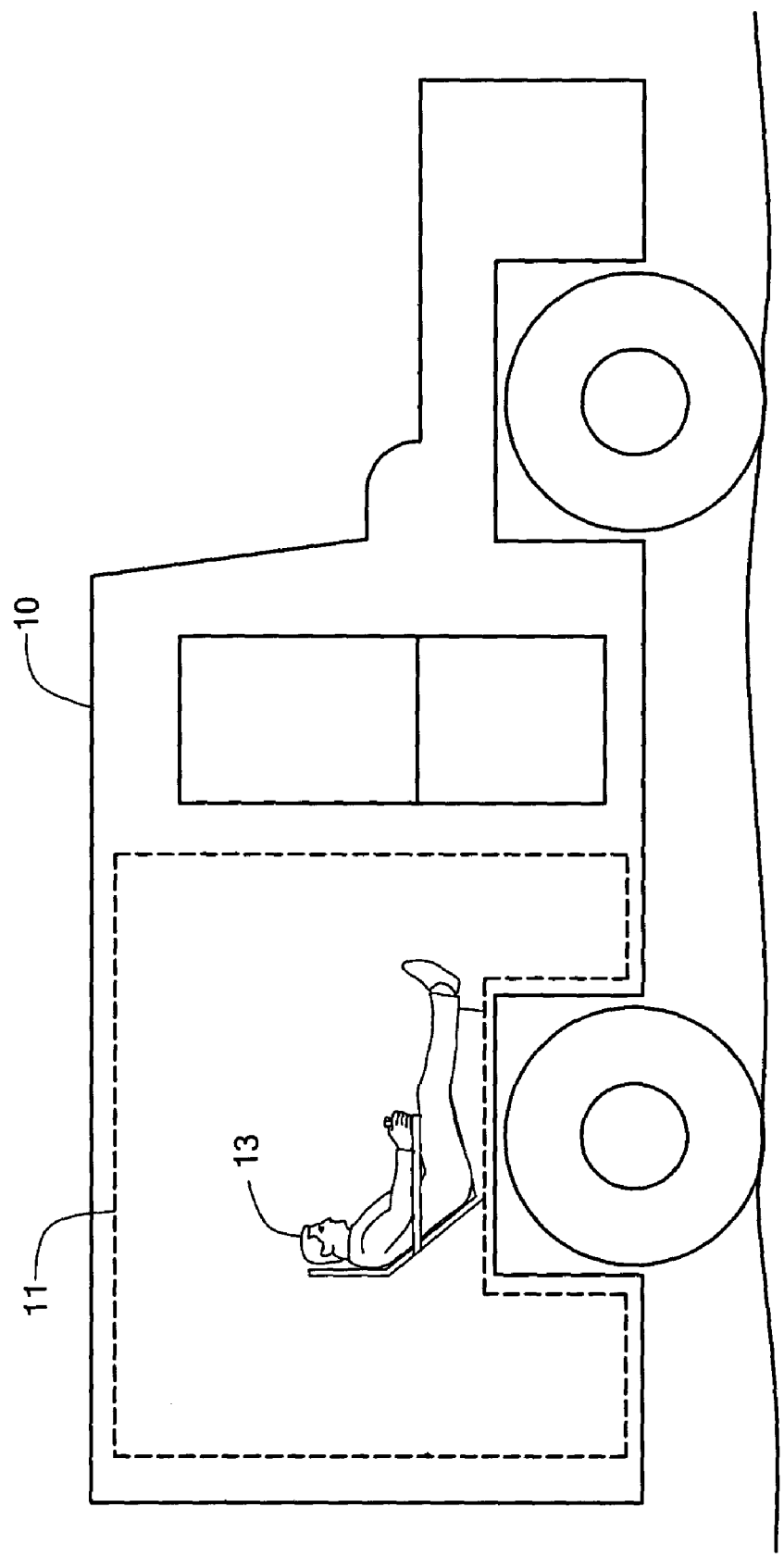
FIG. 1 shows a vehicle incorporating the integrated operator workspace of the present invention.

Referring to FIG. 1, shown is one embodiment of a mobile computing vehicle 10 incorporating the integrated operator workspace 11 in accordance with principles of the present invention. With this arrangement, a user 13 can perform various processing and/or communications tasks with minimal discomfort due to improved workspace arrangements and air circulation, as well as without being required to exit the integrated operator workspace 11 to permit another user (not shown) to enter the integrated operator workspace 11 of the mobile computing vehicle 10, which will be described below is further detail.

Figure 2:
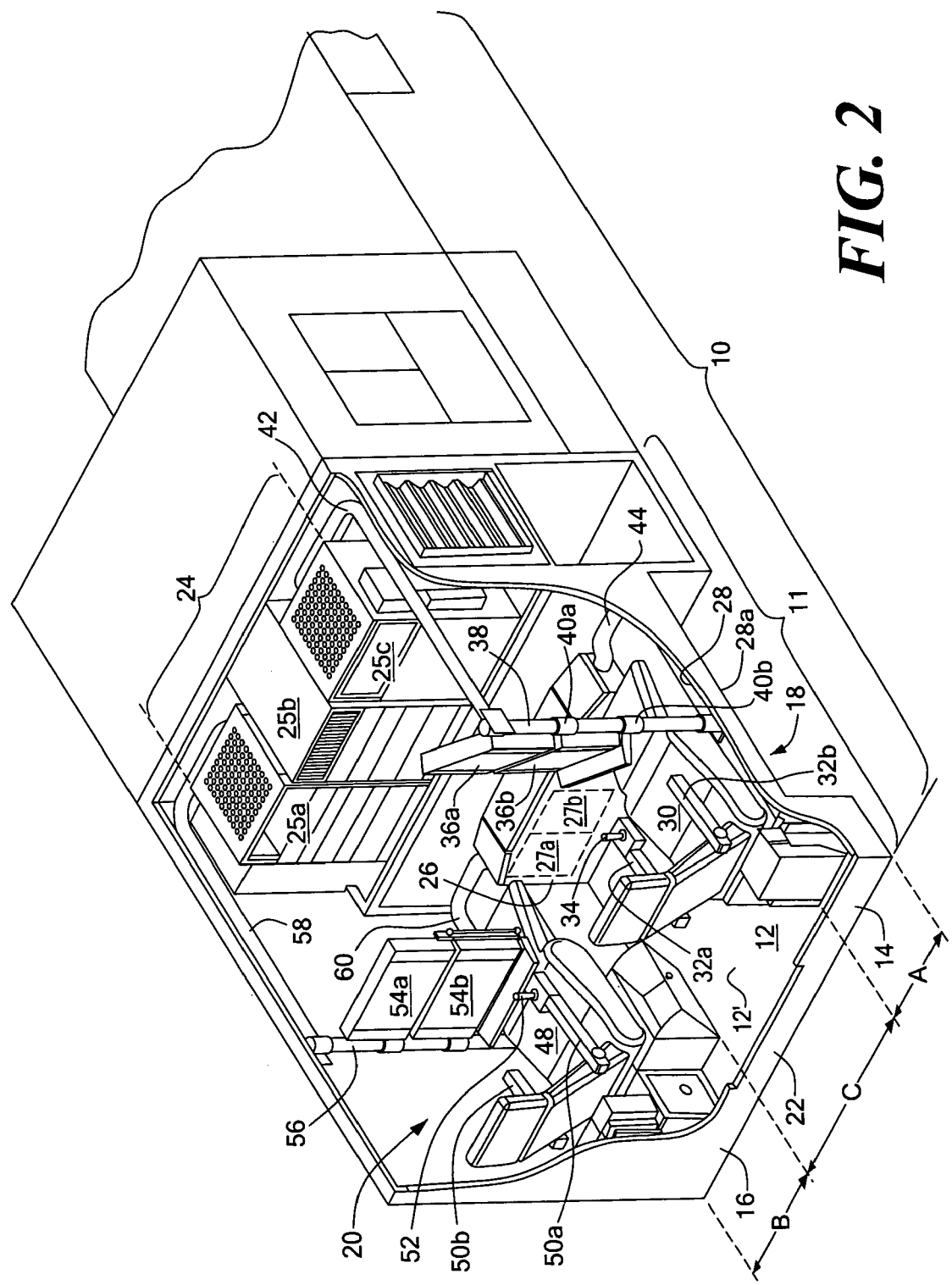
FIG. 2 is an exploded isometric view of the integrated operator workspace of FIG. 1.
Figure 3:
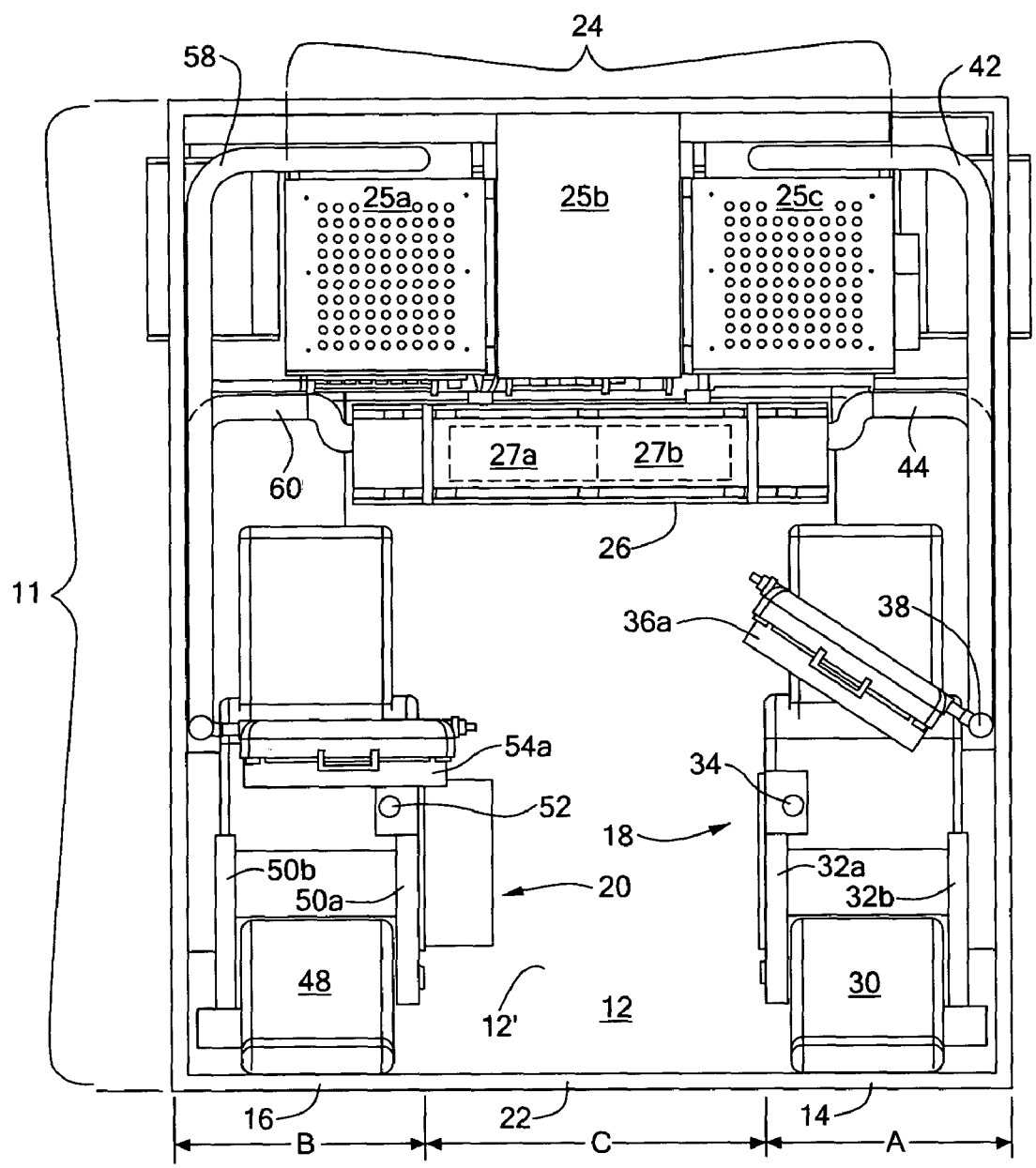
FIG. 3 is a top view of the integrated operator workspace shown in FIG. 2.

Referring now to FIGS. 2 and 3 collectively, shown is one embodiment of an integrated operator workspace 11 incorporated into the mobile computing vehicle 10. The integrated operator workspace 11 includes a base 12 defined by a floor portion 12' of the mobile computing vehicle 10. The base 12 includes a first longitudinal edge region 14 having an approximate width indicated by the arrow "A." The base 12 further includes a second longitudinal edge region 16 having an approximate width indicated by the arrow "B." The first longitudinal edge region 14 of the base 12 is adapted to accommodate a first operator computing or work station 18. Similarly, the second longitudinal edge region 16 of the base 12 is adapted to accommodate a second operator computing or work station 20. The first 18 and second 20 operator computing stations are mounted on the respective first 14 and second 16 longitudinal edge regions of the base 12 so as to form a walkway 22 between the first 18 and second 20 operator computing stations. Furthermore, the walkway 22 has an approximate width, as represented by the arrow "C." The walkway 22 defined between the first 18 and second 20 operator computing stations, permits unimpeded ingress and egress of the integrated operator workspace 11 by a first user operating at the first operator computing station 18 and a second user operating at the second operator computing station 20.

In an exemplary embodiment, the mobile computing vehicle 10 is provided as a Humm-Vee. It should be understood that the integrated operator workspace 11 can also be incorporated into many other mobile computing vehicle types, such as trucks, trains, boats, helicopters, and the like, where a relatively large number of computing and/or communications equipment is required to operate in a relatively small area, while at the same time being highly mobile.

The integrated operator workspace 11 of the exemplary embodiment further includes a first console-rack 24 adapted to retain a first plurality of electronic equipment 25a, 25b, 25c (hereinafter collectively referred to as "first predetermined equipment 25") in a horizontal orientation. The integrated operator workspace 11 can also include a second console-rack 26, which is adapted to retain a second plurality of electronic equipment 27a, 27b (hereinafter collectively referred to as "second predetermined equipment 27") in a vertical orientation. The first 25 and second 27 predetermined equipment, can include one or more of personal computers, servers, communications equipment, radar systems, global positioning systems (GPS), as well as a plurality of other data processing and/or communications equipment not specifically described herein.

In the exemplary embodiment, the first longitudinal edge region 14 of the base 12 includes a first raised platform 28 defined by a first fender-well 28a of the mobile computing vehicle 10. This first raised platform 28, as defined by the first fender-well 28a, provides a mounting surface for a first seat 30 of the first operator computing station 18. The first seat 30 is mounted on the first raised platform 28 substantially facing a direction of travel of the mobile computing vehicle 10, which minimizes motion sickness of a user retained in the first seat 30. The first seat 30 includes at least one arm rest 32a having a removeably mounted first computer interface 34, such as a mouse or a joy stick, adapted to communicate with the first predetermined equipment 25 and/or the second predetermined equipment 27. As shown, the first computer interface 34 is removeably mounted on the left-hand arm rest 32a of the seat 30, however, it should be understood that the first computer interface 34 can be removed and remounted in a similar manner on the right-hand arm rest 32b of the seat.

In the exemplary embodiment, the first operator computing station 18 further includes a first plurality of displays 36a, 36b (e.g., flat panel displays) slideably mounted on a first mounting-post 38. The first plurality of displays 36a, 36b are further mounted on a plurality of articulated arms 40a, 40b, which are adapted to rotate about the first mounting post 38. In this arrangement, a view height of the first plurality of displays 36a, 36b can be adjusted by sliding the first plurality of displays up and/or down the first mounting-post 38. Further, a viewing angle of the first plurality of displays 36a, 36b can be adjusted by rotating the first plurality of displays 36a, 36b about the first mounting-post 38. The first plurality of displays 36a, 36b can also be rotated about the first mounting-post 38 to provide clear and unimpeded access to the first seat 30, which provides reasonably easy ingress and/or egress to/from the seat 30 for the first user of the first operator computing station 18.

The first plurality of displays 36a, 36b are coupled to display information received from the first predetermined equipment 25, which is located in the first console-rack 24 (e.g., horizontally mounted equipment), via an upper electrical raceway 42. Further, the first plurality of displays 36a, 36b are also coupled to display information received from the second predetermined equipment 27, which is located in the second console-rack 26 (e.g., vertically mounted equipment), via a lower electrical raceway 44. The upper and lower electrical raceways 42, 44 each traverse above and substantially along the first longitudinal edge of the base.

The upper and lower electrical raceways 42, 44, which are associated with the first operator computing station 18, can each include a plurality of electrically isolated chambers (not shown) adapted to minimize electrical cross-talk between data buses located in each of the chambers (e.g., minimizes inter-chamber electrical cross-talk). The chambers of each of the electrical raceways 42, 44 can also be isolated from each other using various shielding techniques, such as forming a grounded foil barrier between the chambers.

In the illustrative embodiment, the second operator computing station 20 is similarly constructed and arranged as the first operator computing station 18. More particularly, the second longitudinal edge region 16 of the base 12 includes a second raised platform 46 formed by a second fender-well (not shown) of the mobile computing vehicle 10. This second raised platform 46, which is defined by the second fender-well, provides a mounting surface for a second seat 48 of the second operator computing station 20. The second seat 48 is mounted on the second raised platform substantially facing a direction of travel of the mobile computing vehicle 10, which minimizes motion sickness of a user retained in the second seat 48. The second seat 48 also includes at least one arm rest 50a having a removeably mounted second computer interface 52, such as a mouse or a joy stick, which is adapted to communicate with the first predetermined equipment 25 located in the first console-rack 24 and/or the second predetermined equipment 27 located in the second console-rack 26. As shown, the second computer interface 52 is removeably mounted on a right-hand arm rest 50a of the seat 48, however, it should be understood that the second computer interface 52 can be removed and remounted in a similar manner on the left-hand arm rest 50b of the seat 48.

In the exemplary embodiment, the second operator computing station 20 further includes a second plurality of displays 54a, 54b (e.g., flat panel displays) slideably mounted on a second mounting-post 56. The second plurality of displays 54a, 54b are further mounted on an equal plurality of articulated arms 58a, 58b, which are adapted to rotate about the second mounting post 56. In this arrangement, a view height of the second plurality of displays 54a, 54b can be adjusted by sliding the second plurality of displays 54a, 54b up and/or down the second mounting-post 56. Further, a viewing angle of the second plurality of displays 54a, 54b can be adjusted by rotating the second plurality of displays 54a, 54b about the second mounting-post 56. The second plurality of displays 54a, 54b can also be rotated about the second mounting-post 56 to provide clear and unimpeded access to the second seat 48, which provides reasonably easy ingress and/or egress for the second user of the second operator computing station 20.

The second plurality of displays 54a, 54b are coupled to display information received from the first predetermined equipment 25 located in the first console-rack 24 (e.g., horizontally mounted equipment), via an upper electrical raceway 58. Further, the second plurality of displays 54a, 54b are also coupled to display information received from the second predetermined equipment 27 located in the second console-rack 26 (e.g., vertically mounted equipment), via a lower electrical raceway 60. The upper and lower electrical raceways 58, 60 each traverse above and substantially along the second longitudinal edge 16 of the base 72.

The upper and lower electrical raceways 58, 60, which are associated with the second operator computing station 20 can each include a plurality of electrically isolated chambers (not shown), which are adapted to minimize electrical crosstalk between data buses located in each of the chambers (e.g., minimizes inter-chamber electrical cross-talk). The chambers can be isolated from each other using various shielding techniques, such as forming a grounded foil barrier between the chambers.

With the above-described arrangement of the integrated operator workspace 11, the relatively limited space that is available in the mobile computing vehicle 10 is optimized to accommodate the first and second plurality of equipment 25, 27, such as radar, computer and/or communications equipment, as well as to accommodate a number of users of the equipment without any undue discomfort. The arrangement of the integrated operator workspace 11 also enhances user ingress and/or egress by permitting each user to independently ingress or egress the integrated operator workspace 11 without disturbing other users. A significant improvement in air circulation is also realized by the arrangement of the integrated operator workspace 11, which permits relatively easier cooling and/or heating of the integrated operator workspace 11.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A vehicle including an integrated operator workspace, comprising:
   a base having a first longitudinal edge and a second longitudinal edge, the first longitudinal edge of the base includes a first raised platform, the first raised platform includes a first fender-well of the vehicle;
   a first operator station of a plurality of operator stations located adjacent to the first longitudinal edge of the base, the first operator station includes a first seat mounted on the first fender-well;
   a second operator station of the plurality of operator stations located adjacent to the second longitudinal edge of the base; and
   a plurality of electronic equipment coupled to the first operator station and the second operator station, wherein the first operator station and the second operator station are separated by a first predetermined space for permitting substantially unimpeded ingress and egress of the integrated operator workspace by at least a first user operating at the first operator station and at least a second user operating at the second operator station.

2. The integrated operator workspace of claim 1, wherein the vehicle includes a highly mobile multi-wheeled vehicle.

3. The integrated operator workspace of claim 1, wherein the first seat is mounted on the first fender-well substantially facing a direction of travel of the vehicle.

4. The integrated operator workspace of claim 3, wherein the first seat includes at least one arm rest having a removeably mounted first computer interface adapted to communicate with the plurality of electronic equipment.

5. The integrated operator workspace of claim 4, wherein the first operator station further includes at least one display slidably mounted on a first mounting-post and being in a communication relationship with the plurality of electronic equipment.

6. The integrated operator workspace of claim 5, further including at least one electrical raceway coupled between the first mounting-post and the plurality of electronic equipment and traversing above and substantially along the first longitudinal edge of the base.

7. The integrated operator workspace of claim 6, wherein the at least one electrical raceway includes a plurality of electrically isolated chambers adapted to minimize electrical cross-talk between data buses disposed in at least a first electrically isolated chamber and at least a second electrically isolated chamber of the plurality of electrically isolated chambers of the at least one electrical raceway.

8. The integrated operator workspace of claim 1, wherein the second longitudinal edge of the base includes a second raised platform.

9. The integrated operator workspace of clam 8, wherein the second raised platform includes a second fender-well of the vehicle.

10. The integrated operator workspace of claim 9, wherein the second operator station includes a second seat mounted on the second fender-well.

11. The integrated operator workspace of claim 10, wherein the second seat is mounted on the second fender-well substantially facing a direction of travel of the vehicle.

12. The integrated operator workspace of claim 11, wherein the second seat includes at least one arm rest having a removeably mounted second computer interface adapted to communicate with the plurality of electronic equipment.

13. The integrated operator workspace of claim 12, wherein the second operator station further includes at least one display slidably mounted on a second mounting-post and being in a communication relationship with the plurality of electronic equipment.

14. The integrated operator workspace of claim 13, her including at least one electrical raceway coupled between the second mounting-post and the plurality of electronic equipment and traversing above and substantially along the second longitudinal edge of the base.

15. The integrated operator workspace of claim 14, wherein the at least one electrical raceway includes a plurality of electrically isolated chambers adapted to minimize electrical cross-talk between data buses disposed in at least a first electrically isolated chamber and at least a second electrically isolated chamber of the plurality of electrically isolated chambers of the at least one electrical raceway.

16. A vehicle comprising:
   a body;
   an engine disposed within the body and configured to move the vehicle; and
   an integrated operator workspace disposed within the body, the integrated operator workspace comprising:
      a base having a first longitudinal edge and a second longitudinal edge, the first longitudinal edge of the base comprises a first raised platform;
      a first operator station located adjacent to the first longitudinal edge of the base;
      a second operator station located adjacent to the second longitudinal edge of the base; and
      electronic equipment coupled to the first operator station and the second operator station, wherein the first operator station and the second operator station are separated by a first predetermined space for permitting substantially unimpeded ingress and egress of the integrated operator workspace by at least a first user operating at the first operator station and at least a second user operating at the second operator station.

17. The integrated operator workspace of claim 16 wherein the vehicle is a highly mobile multi-wheeled vehicle.

18. The integrated operator workspace of claim 16 wherein the first raised platform comprises a first fender-well of the vehicle.

19. The integrated operator workspace of claim 18 wherein the first operator station comprises a first seat mounted on the first fender-well.

20. The integrated operator workspace of claim 19 wherein the first seat is mounted on the first fender-well substantially facing a direction of travel of the vehicle.

21. The integrated operator workspace of claim 20 wherein the first seat comprises at least one arm rest having a removeably mounted first computer interface adapted to communicate with the electronic equipment.

22. The integrated operator workspace of claim 21 wherein the first operator station further comprising at least one display slidably mounted on a first mounting-post and being in a communication relationship with the electronic equipment.

23. The integrated operator workspace of claim 22, further including at least one electrical raceway coupled between the first mounting-post and the electronic equipment and traversing above and substantially along the first longitudinal edge of the base.

24. The integrated operator workspace of claim 23 wherein the at least one electrical raceway comprises electrically isolated chambers adapted to minimize electrical cross-talk between data buses disposed in at least a first electrically isolated chamber and at least a second electrically isolated chamber of the electrically isolated chambers of the at least one electrical raceway.

25. The integrated operator workspace of claim 16 wherein the second longitudinal edge of the base comprises a second raised platform.

26. The integrated operator workspace of claim 25 wherein the second raised platform comprises a second fender-well of the vehicle.

27. The integrated operator workspace of claim 26 wherein the second operator station comprises a second seat mounted on the second fender-well.

28. The integrated operator workspace of claim 27 wherein the second seat is mounted on the second fender-well substantially facing a direction of travel of the vehicle.

29. The integrated operator workspace of claim 28 wherein the second seat comprises at least one arm rest having a removeably mounted second computer interface adapted to communicate with the plurality of electronic equipment.

30. The integrated operator workspace of claim 29 wherein the second operator station further comprising at least one display slidably mounted on a second mounting-post and being in a communication relationship with the electronic equipment.

31. The integrated operator workspace of claim 30, further comprising at least one electrical raceway coupled between the second mounting-post and the electronic equipment and traversing above and substantially along the second longitudinal edge of the base.

32. The integrated operator workspace of claim 31 wherein the at least one electrical raceway comprises a electrically isolated chambers adapted to minimize electrical cross-talk between data buses disposed in at least a first electrically isolated chamber and at least a second electrically isolated chamber of the electrically isolated chambers of the at least one electrical raceway.

33. A vehicle comprising:
an integrated operator workspace, the integrated operator workspace comprising:
a base having a first longitudinal edge and a second longitudinal edge, the first longitudinal edge of the base comprises a first raised platform, the first raised platform comprises a first fender-well of the vehicle, the second longitudinal edge of the base comprises a second raised platform;
a first operator station located adjacent to the first longitudinal edge of the base, the first operator station comprises a first seat mounted on the first fender-well;
a second operator station located adjacent to the second longitudinal edge of the base; and
electronic equipment coupled to the first operator station and the second operator station, wherein the first operator station and the second operator station are separated by a first predetermined space for permitting substantially unimpeded ingress and egress of the integrated operator workspace by at least a first user operating at the first operator station and at least a second user operating at the second operator station.

34. The integrated operator workspace of claim 33 wherein the first seat is mounted on the first fender-well substantially facing a direction of travel of the vehicle.

35. The integrated operator workspace of claim 34, wherein the first seat comprises at least one arm rest having a removeably mounted first computer interface adapted to communicate with the plurality of electronic equipment.

36. The integrated operator workspace of claim 35 wherein the first operator station further comprising at least one display slidably mounted on a first mounting-post and being in a communication relationship with the electronic equipment.

37. The integrated operator workspace of claim 36, further comprising at least one electrical raceway coupled between the first mounting-post and the plurality of electronic equipment and traversing above and substantially along the first longitudinal edge of the base.

38. The integrated operator workspace of claim 37 wherein the at least one electrical raceway comprises electrically isolated chambers adapted to minimize electrical cross-talk between data buses disposed in at least a first electrically isolated chamber and at least a second electrically isolated chamber of the electrically isolated chambers of the at least one electrical raceway.

* * * * *

UNITED STATES PATENT AND TRADEMARK OFFICE
CERTIFICATE OF CORRECTION

PATENT NO. : 7,080,865 B2
APPLICATION NO. : 10/631138
DATED : July 25, 2006
INVENTOR(S) : Bergeron et al.

It is certified that error appears in the above-identified patent and that said Letters Patent is hereby corrected as shown below:

Column 2, line 38, delete "is further detail." and replace with -- in further detail. --

Column 6, line 34, delete "her" and replace with -- further --.

Column 8, lines 2-3, delete "a electrically isolated chambers" and replace with -- electrically isolated chambers --.

Signed and Sealed this

Twenty-seventh Day of March, 2007

JON W. DUDAS
*Director of the United States Patent and Trademark Office*